(12) United States Patent
Kooiman et al.

(10) Patent No.: US 10,364,039 B2
(45) Date of Patent: Jul. 30, 2019

(54) DEFORMABLE CLIPS FOR AN AIRCRAFT FUEL SYSTEMS

(71) Applicant: Bell Helicopter Textron Inc., Fort Worth, TX (US)

(72) Inventors: James Everett Kooiman, Fort Worth, TX (US); Charles David Hogue, Fort Worth, TX (US); George Ryan Decker, Fort Worth, TX (US); Andrew G. Baines, Fort Worth, TX (US); Douglas Kirk Wolfe, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 353 days.

(21) Appl. No.: 15/496,257

(22) Filed: Apr. 25, 2017

(65) Prior Publication Data

US 2018/0305037 A1 Oct. 25, 2018

(51) Int. Cl.
| | | |
|---|---|---|
| *B64D 37/04* | (2006.01) | |
| *B64D 37/06* | (2006.01) | |
| *B64D 37/32* | (2006.01) | |
| *B64C 29/00* | (2006.01) | |
| *B64C 3/34* | (2006.01) | |
| *B64C 3/26* | (2006.01) | |

(52) U.S. Cl.
CPC ............ *B64D 37/06* (2013.01); *B64C 3/26* (2013.01); *B64C 3/34* (2013.01); *B64C 29/0033* (2013.01); *B64D 37/04* (2013.01); *B64D 37/32* (2013.01)

(58) Field of Classification Search
CPC ........ B64D 37/04; B64D 37/06; B64D 37/32; B64C 3/34
See application file for complete search history.

(56) References Cited

U.S. PATENT DOCUMENTS

| | | | |
|---|---|---|---|
| 3,043,542 A | 7/1962 | Neuschotz | |
| 9,296,467 B1* | 3/2016 | Hollibaugh | B64C 3/34 |
| 2009/0294591 A1* | 12/2009 | Ramirez Blanco | B64C 1/1446 244/129.4 |
| 2012/0098212 A1* | 4/2012 | Bogiatzis | B64C 3/34 277/637 |
| 2012/0187247 A1* | 7/2012 | Delgado Jareno | B64C 1/1446 244/129.5 |
| 2013/0225064 A1* | 8/2013 | Jakus | B65D 90/34 454/340 |
| 2013/0306796 A1* | 11/2013 | Alazraki | B64C 3/34 244/129.2 |
| 2016/0176496 A1* | 6/2016 | Han | B64C 1/1446 244/129.4 |
| 2016/0229516 A1* | 8/2016 | Behrens | B64C 1/062 |

* cited by examiner

*Primary Examiner* — Philip J Bonzell
*Assistant Examiner* — Tye William Abell
(74) *Attorney, Agent, or Firm* — Lawrence Youst PLLC (57) ABSTRACT

A fuel system for an aircraft includes a fuel cell having a plurality of sides including a first side and at least one deformable clip having a secured end and a free end. The secured end is coupled to the first side of the fuel cell and the free end overlapping the airframe of the aircraft such that the first side of the fuel cell is positioned adjacent to the airframe. The at least one deformable clip is deformable to allow the fuel cell to move independently of the airframe in response to an impact of the aircraft, thereby protecting the fuel cell from damage resulting from the impact.

20 Claims, 7 Drawing Sheets

DEFORMABLE CLIPS FOR AN AIRCRAFT FUEL SYSTEMS

TECHNICAL FIELD OF THE DISCLOSURE

The present disclosure relates, in general, to fuel systems for use on aircraft and, in particular, to aircraft fuel systems that utilize deformable clips to secure fuel cells to the airframe of the aircraft.

BACKGROUND

Fuel cells, such as fuel bags, may be used to store fuel within the airframe of an aircraft, such as within the fuselage or wings. Fuel cells may be supported by the airframe structure immediately surrounding the fuel cells. Tabs or other securing devices may be utilized to physically attach the fuel cells to the airframe, which, in the case of fuel bags, allow the fuel bags to maintain their general shape regardless of the amount of fuel contained therein. In an impact or other crash scenario, however, fuel cells are subject to strong, random and multi-directional forces, and a rigid attachment between the fuel cells and the airframe can cause the fuel cells to rupture, leading to a fuel leakage and possibly an explosion or conflagration. In addition, fuel cells must be easily accessible to perform such operations as refueling, fuel cell maintenance, fuel cell replacement and the like. A port or other hole through which to access the fuel cell is often located at or near load-bearing portions of the aircraft, such as the outer skin of the fuselage or wing. Current fuel bag securing mechanisms are unable to accommodate load-bearing components at or near the holes through which fuel cells are accessed. Accordingly, a need has arisen for a fuel system in which a fuel cell is secured to the airframe, but is able to move independently of the airframe upon impact, thereby protecting the structural integrity of the fuel cell, while still allowing for the integration of load-bearing structure at or near locations of the airframe where access to the fuel cell is required.

SUMMARY

In a first aspect, the present disclosure is directed to a fuel system for an aircraft having an airframe. The fuel system includes a fuel cell having a plurality of sides including a first side and at least one deformable clip having a secured end and a free end, the secured end coupled to the first side of the fuel cell, the free end overlapping the airframe such that the first side of the fuel cell is positioned adjacent to the airframe. The deformable clip is deformable to allow the fuel cell to move independently of the airframe in response to an impact of the aircraft, thereby protecting the fuel cell from damage resulting from the impact.

In some embodiments, the airframe may have a rim with an access hole defined therein, the free end of the deformable clip adapted to overlap the rim. In certain embodiments, the fuel system may include an access cover coupled to the airframe and adapted to cover the access hole. In some embodiments, the rim and the access cover may form a receiving cavity adapted to receive the free end of the deformable clip. In certain embodiments, the rim may include a receiving groove at least partially forming the receiving cavity. In some embodiments, the airframe may include an access cover receiving ring forming the rim, the access cover coupled to the access cover receiving ring. In such embodiments, the free end of the deformable clip may overlap the access cover receiving ring. In certain embodiments, the access hole may be formed at a load-bearing portion of the airframe adapted to withstand a threshold load and the access cover may include a load-bearing access cover adapted to withstand the threshold load. In some embodiments, the load-bearing portion of the airframe may include a wing skin contoured into a wing shape and the threshold load may include a threshold wing load. In such embodiments, the access cover may be shaped to match the contour of the wing skin and may be adapted to withstand the threshold wing load. Certain embodiments may include a plurality of deformable clips circumferentially disposed around the access hole, each having a free end overlapping the rim.

In some embodiments, the first side of the fuel cell may include a bottom side of the fuel cell. In certain embodiments, the bottom side of the fuel cell may include a sump plate adjacent to the access hole, the sump plate adapted to accumulate fuel, the secured end of each of the plurality of deformable clips coupled to the sump plate. In some embodiments, the deformable clips may deform to allow the first side of the fuel cell to move away from the access hole in response to the impact of the aircraft. In certain embodiments, the deformable clips may be bendable clips that allows the fuel cell to move independently of the airframe in response to the impact of the aircraft. In some embodiments, the bendable clips may move into a non-overlapping relationship with the airframe to allow the fuel cell to move independently of the airframe in response to the impact of the aircraft. In certain embodiments, the deformable clips may be frangible clips subject to fracture to allow the fuel cell to move independently of the airframe in response to the impact of the aircraft.

In a second aspect, the present disclosure is directed to an aircraft including an airframe and a fuel system. The fuel system includes a fuel cell having a plurality of sides including a first side and at least one deformable clip having a secured end and a free end, the secured end coupled to the first side of the fuel cell, the free end overlapping the airframe such that the first side of the fuel cell is positioned adjacent to the airframe. The deformable clip is deformable to allow the fuel cell to move independently of the airframe in response to an impact of the aircraft, thereby protecting the fuel cell from damage resulting from the impact.

In some embodiments, the aircraft may include a tiltrotor aircraft. In certain embodiments, the airframe may include a wing airframe including a rim with an access hole defined therein and the fuel system may include an access cover coupled to the wing airframe and adapted to cover the access hole. In such embodiments, the rim and the access cover may form a receiving cavity adapted to receive the free end of the deformable clip. In some embodiments, the wing airframe may include a wing skin that is subject to a wing load during flight. In such embodiments, the access cover may be adapted to withstand the wing load. In certain embodiments, the fuel cell may include a fuel bag.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
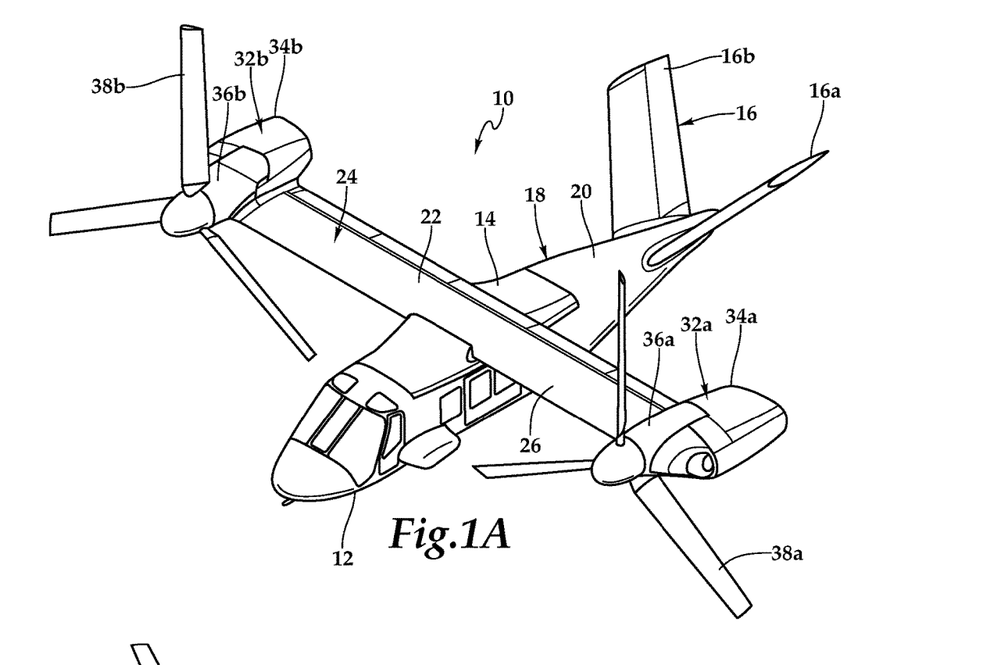
FIGS. 1A-1C are schematic illustrations of a tiltrotor aircraft having a fuel system utilizing deformable clips in accordance with embodiments of the present disclosure.
Figure 1B:
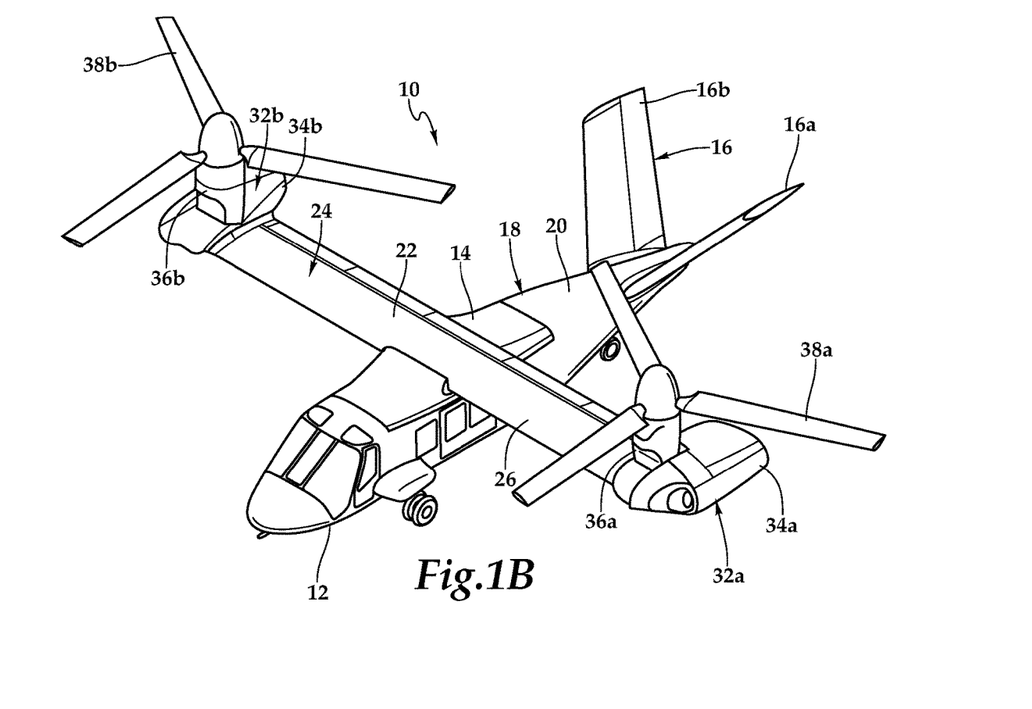
Figure 1C:
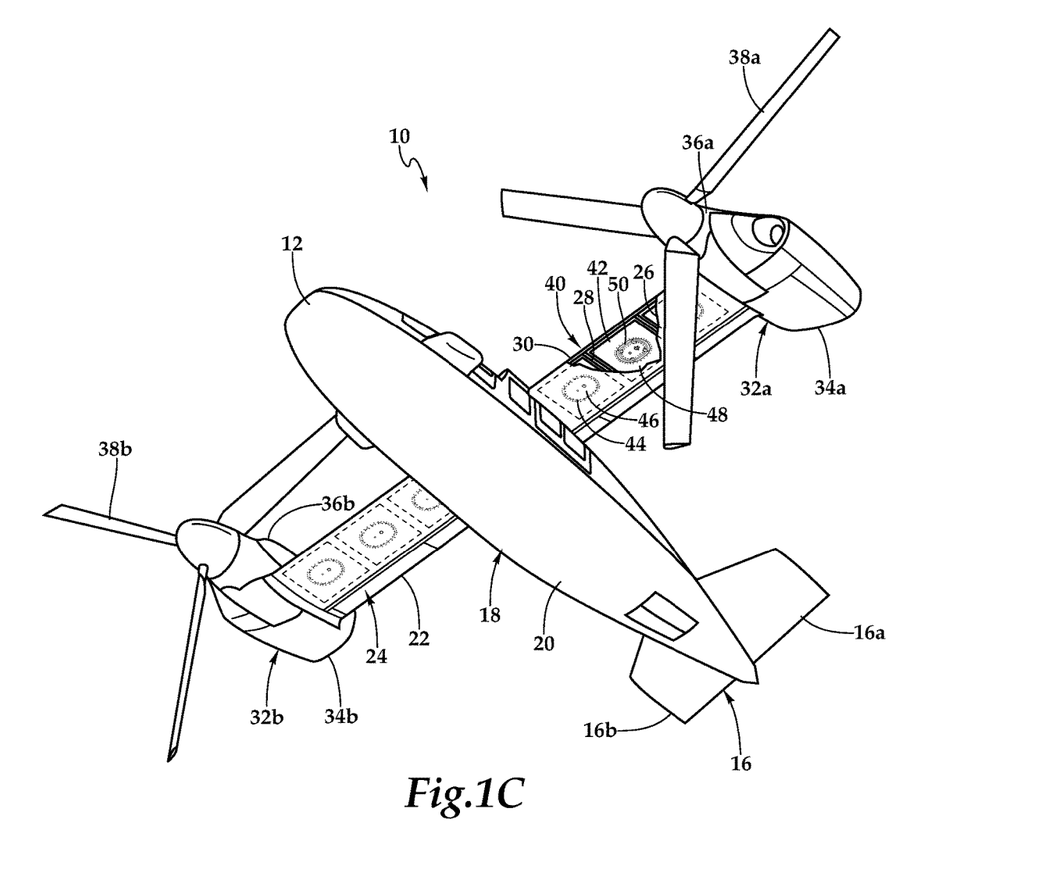
Figures 2A, 2B, 2C:
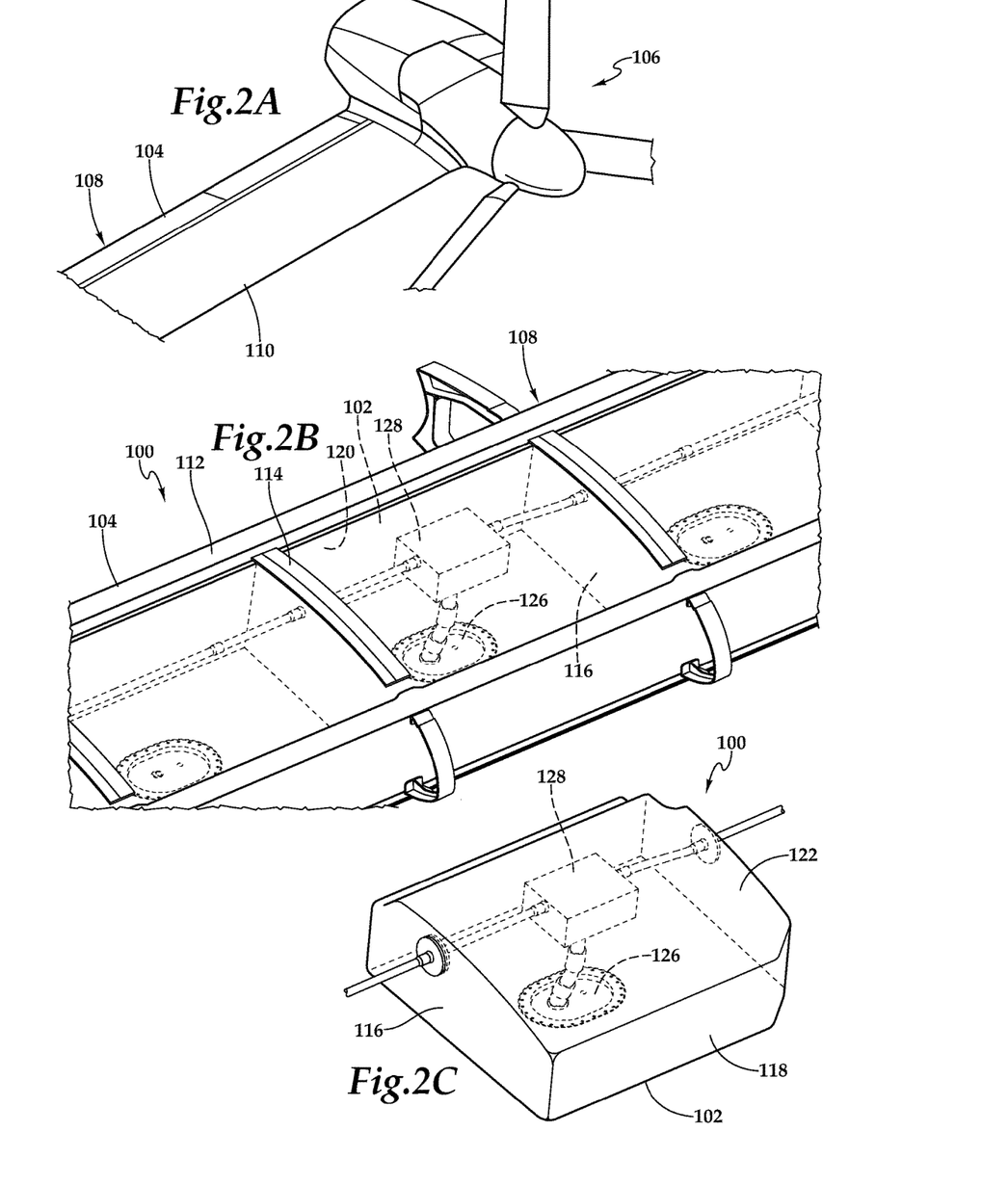
FIGS. 2A-2C are isometric views of a wing in which fuel cells are disposed in accordance with embodiments of the present disclosure.

Referring to FIGS. 1A-1C in the drawings, a tiltrotor aircraft is schematically illustrated and generally designated 10. Tiltrotor aircraft 10 includes a fuselage 12, a wing mount assembly 14 and a tail section 16 including rotatably mounted tail members 16a, 16b having control surfaces operable for horizontal and/or vertical stabilization during forward flight. Fuselage 12 is supported by an airframe 18, which includes fuselage skin 20 and other internal support structure, such as beams or scaffolding. A wing 22 is supported by fuselage 12. Wing 22 is supported by a wing airframe 24, which includes wing skin 26 and other internal support structure, such as ribs 28 and spars 30. Located at outboard ends of wing 22 are propulsion assemblies 32a, 32b. Propulsion assembly 32a includes a fixed nacelle 34a that houses an engine and a transmission. In addition, propulsion assembly 32a includes a pylon assembly 36a that is rotatable relative to fixed nacelle 34a between a generally horizontal orientation, as best seen in FIG. 1A, and a generally vertical orientation, as best seen in FIG. 1B. Propulsion assembly 32a also includes a proprotor assembly 38a that is rotatable relative to pylon assembly 36a responsive to torque and rotational energy provided by a rotor hub assembly and drive system mechanically coupled to the engine and transmission. Similarly, propulsion assembly 32b includes a fixed nacelle 34b that houses an engine and transmission, a pylon assembly 36b that is rotatable relative to fixed nacelle 34b and a proprotor assembly 38b that is rotatable relative to pylon assembly 36b responsive to torque and rotational energy provided via a rotor hub assembly and drive system mechanically coupled to the engine and transmission housed by fixed nacelle 34b. As used herein, the term "coupled" may include direct or indirect coupling by any means, including moving and/or non-moving mechanical connections.

FIG. 1A illustrates tiltrotor aircraft 10 in airplane or forward flight mode, in which proprotor assemblies 38a, 38b are rotating in a substantially vertical plane to provide a forward thrust enabling wing 22 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 38a, 38b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 38a, 38b are selectively positioned between forward flight mode and VTOL flight mode, which can be referred to as a conversion flight mode. Even though tiltrotor aircraft 10 has been described as having one engine in each fixed nacelle 34a, 34b, it should be appreciated by those having ordinary skill in the art that other engine arrangements are possible and are considered to be within the scope of the present disclosure including, for example, alternatively or additionally having an engine housed within fuselage 12 that provides torque and rotational energy to both proprotor assemblies 38a, 38b.

Tiltrotor aircraft 10 has a fuel system 40 that includes one or more fuel cells 42 disposed inside wing 22. Fuel cells 42 may be bags or bladders that are flexible, semi-rigid or rigid. For example, fuel cells 42 may be fuel bags formed from Kevlar or rubber, among other materials. In other embodiments, fuel cells 42 may be tanks formed from a rigid material, such as metal, polymer, plastic or any other rigid material. To allow for access to fuel cells 42, wing skin 26 forms one or more access holes 44 that may be covered by access covers 46. Access covers 46 attach using fasteners to a portion of wing airframe 24, such as wing skin 26, and act as a load-carrying and aerodynamic surface of wing 22. For example, wing skin 26 is subject to a wing load during flight and access covers 46 are adapted to withstand the wing load to which wing skin 26 is subjected. The bottom side 48 of fuel cells 42 are secured to wing airframe 24 using one or more deformable clips 50 adjacent to access holes 44. Deformable clips 50 secure fuel cells 42 to wing airframe 24 during normal operation and are operable to deform during or after an aircraft impact, such as a crash, to prevent damage to fuel cells 42. Deformable clips 50 allow an external cover, such as access covers 46 or fuel port covers, to be structurally tied into airframe 18, including wing airframe 24, so that the external cover may bear the load carried by surrounding structure. Such load-bearing covers are not accommodated by previous fuel cell securing mechanisms.

It should be appreciated that tiltrotor aircraft 10 is merely illustrative of a variety of aircraft that can implement the embodiments disclosed herein. Indeed, fuel system 40 may be utilized on any aircraft that utilizes fuel cells. Other aircraft implementations can include hybrid aircraft, tiltwing aircraft, quad tiltrotor aircraft, unmanned aircraft, gyrocopters, airplanes, jets, helicopters and the like. As such, those of ordinary skill in the art will recognize that fuel system 40 can be integrated into a variety of aircraft configurations. It should be appreciated that even though aircraft are particularly well-suited to implement the embodiments of the present disclosure, non-aircraft vehicles and devices can also implement the embodiments, including, but not limited to, automobiles or land-based vehicles.

Figure 3A:
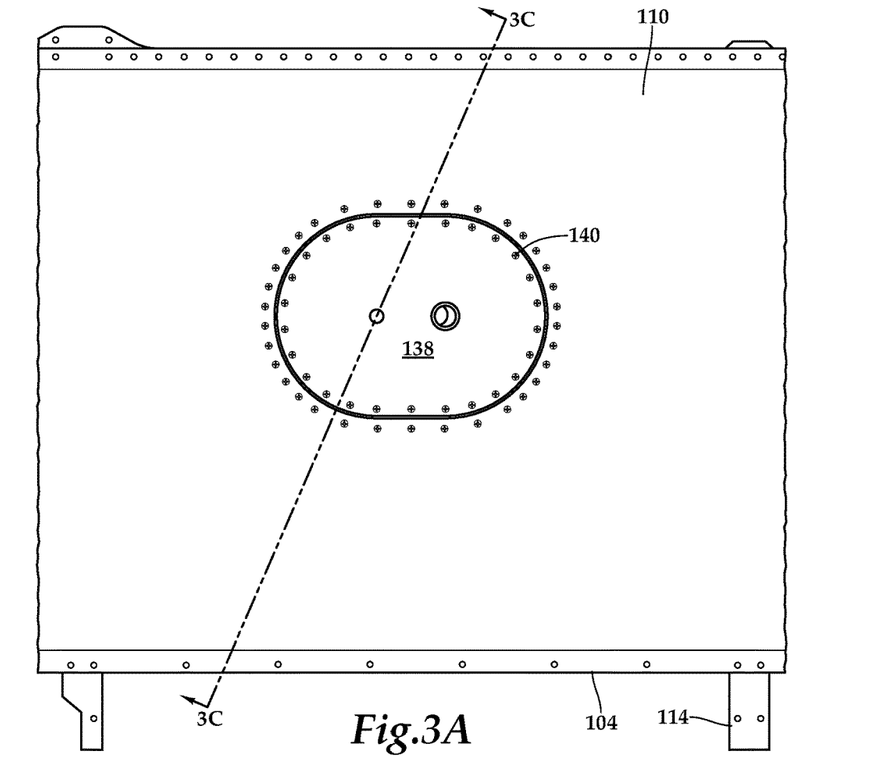
FIGS. 3A-3C are various views of a portion of a wing in which a fuel cell is secured by deformable clips in accordance with embodiments of the present disclosure.
Figure 3B:
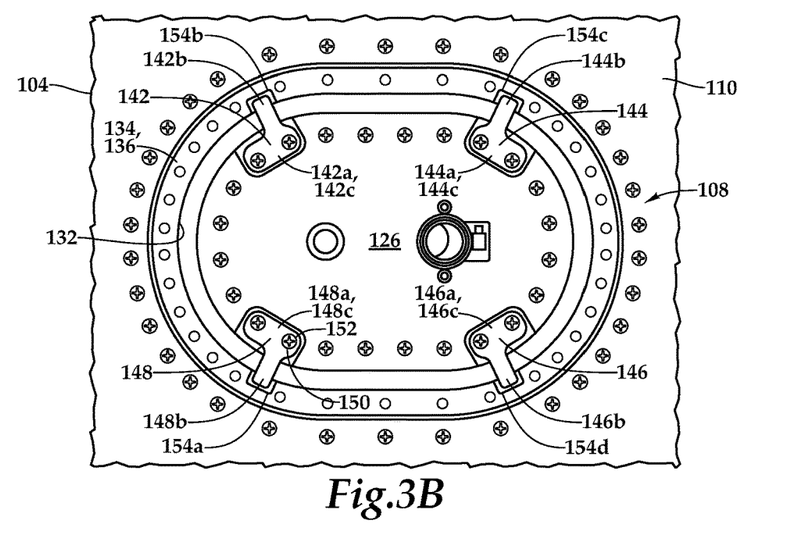
Figure 3C:
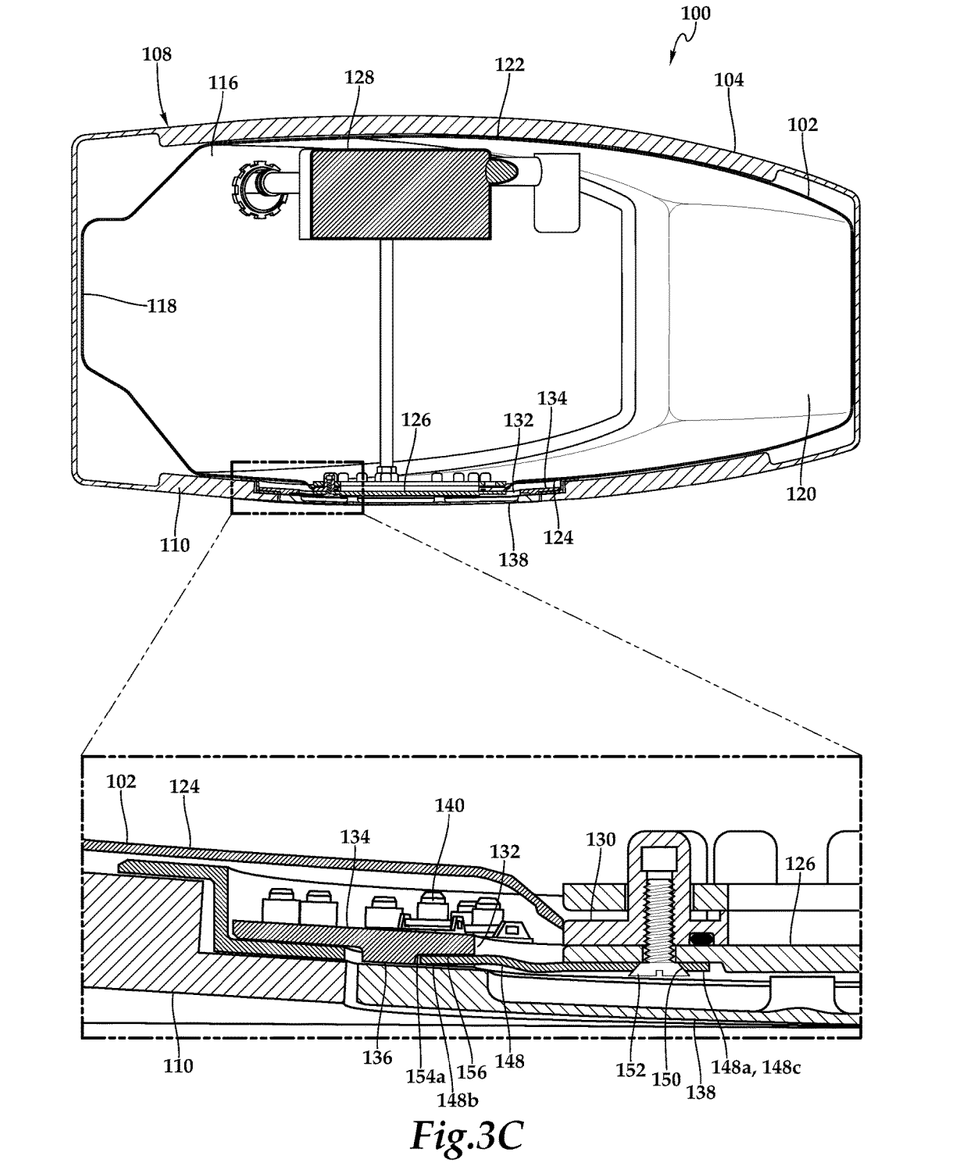
Figure 4A:
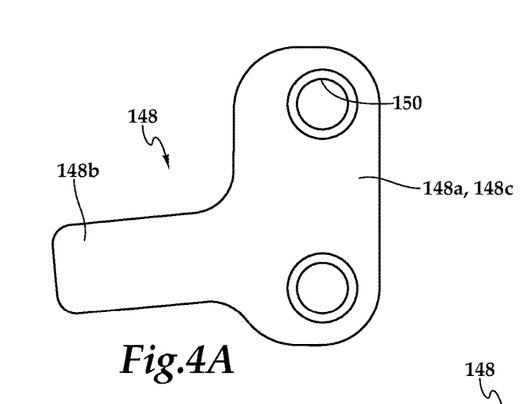
FIGS. 4A-4B are various views of a deformable clip in accordance with embodiments of the present disclosure.
Figure 4B:
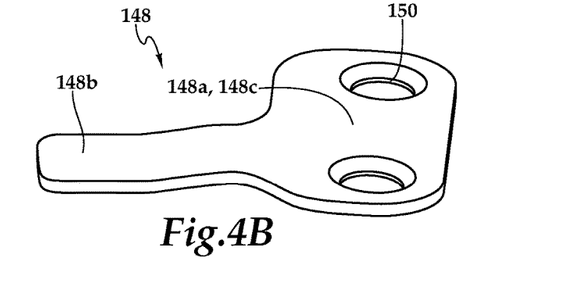

Referring to FIGS. 2A-2C, 3A-3C, 4A-4B and 5A-5C in the drawings, a fuel system is schematically illustrated and generally designated 100. Fuel system 100 includes one or more fuel cells 102 disposed within wing 104 of aircraft 106. Wing 104 is supported by wing airframe 108, which includes wing skin 110, spars 112 and ribs 114. Fuel cell 102 includes lateral sides 116, aft side 118, forward side 120, top side 122 and bottom side 124. Bottom side 124 of fuel cell 102 includes a sump plate 126 at which fuel inside of fuel cell 102 accumulates. A sump pump 128, which is in fluid communication with sump plate 126, pumps fuel accumulated at sump plate 126 to other portions of fuel system 100. As best seen in FIG. 3C, which is a cross-sectional view of FIG. 3A taken along line 3C-3C, bottom side 124 of fuel cell 102 may include a sump plate receiving rim 130 onto which sump plate 126 may couple. Sump plate receiving rim 130 may be formed from any material, such as a metal or a non-rigid material.

Under normal operating conditions, sump plate 126 is adjacent to access hole 132 formed in access cover receiving ring 134, which is part of wing airframe 108. An inner portion of the underside of access cover receiving ring 134 forms a rim 136 around access hole 132. Access cover 138 is coupled to access cover receiving ring 134 using one or more fasteners 140 to cover access hole 132. As best seen in FIGS. 3A and 3B, access hole 132 and access cover 138 are located on the underside of wing 104. Access cover 138 is capable of transferring load across access hole 132. Wing skin 110 is a load-bearing portion of wing airframe 108 that is adapted to withstand a threshold wing load, and which forms access hole 132. Wing skin 110 is contoured into a wing shape having an aerodynamic profile suitable for flight. Access cover 138 is shaped to match the contour of wing skin 110 to keep the same aerodynamic profile as the surrounding portion of wing 104. Access cover 138 is also capable of withstanding the threshold wing load experienced by wing skin 110 so that access cover 138 itself is load-bearing. While access cover 138 is illustrated as a substantially flat component that integrates with the contour of wing 104, in other embodiments, such as those in which access cover 138 is not located on wing 104, access cover 138 may be any suitable shape.

Fuel system 100 includes deformable clips 142, 144, 146, 148 each having a secured end 142a, 144a, 146a, 148a and a free end 142b, 144b, 146b, 148b, respectively. Secured ends 142a, 144a, 146a, 148a are enlarged portions 142c, 144c, 146c, 148c of deformable clips 142, 144, 146, 148, respectively. Enlarged portions 142c, 144c, 146c, 148c each include one or more holes 150 into which fasteners 152 are insertable to couple enlarged portions 142c, 144c, 146c, 148c to bottom side 124, and in particular sump plate 126, of fuel cell 102. As best seen in FIG. 3B, in which access cover 138 is removed from the underside of wing 104, deformable clips 142, 144, 146, 148 are circumferentially coupled around sump plate 126 such that deformable clips 142, 144, 146, 148 are circumferentially disposed around access hole 132. Deformable clips 142, 144, 146, 148, however, may be disposed in any arrangement relative to sump plate 126 and/or access hole 132. Also, while four deformable clips 142, 144, 146, 148 are illustrated, any number of deformable clips may be utilized to secure sump plate 126 adjacent access hole 132. As best seen in FIGS. 3B and 3C, free ends 142b, 144b, 146b, 148b of deformable clips 142, 144, 146, 148 overlap wing airframe 108, and in particular rim 136 of access cover receiving ring 134 surrounding access hole 132, such that bottom side 124 of fuel cell 102 is positioned adjacent to wing skin 110 and sump plate 126 is secured to wing skin 110 generally adjacent to or within access hole 132 during normal operating conditions. Free ends 142b, 144b, 146b, 148b of deformable clips 142, 144, 146, 148 may overlap rim 136 of access cover receiving ring 134 by any amount suitable for detachably securing sump plate 126 adjacent to access hole 132.

As best seen in FIGS. 3B and 3C, access cover receiving ring 134 includes receiving groove 154a in rim 136 that along with access cover 138 forms a receiving cavity 156 that receives free end 148b of deformable clip 148 such that free end 148b of deformable clip 148 is sandwiched or interposed between access cover receiving ring 134 and access cover 138. In similar fashion, access cover receiving ring 134 may also include receiving grooves 154b, 154c, 154d in rim 136 that form receiving cavities with access cover 138 into which free ends 142b, 144b, 146b are receivable, respectively. While receiving cavity 156 is illustrated as being formed by access cover receiving ring 134 and access cover 138, receiving cavities may be fully or partially formed by any portion of wing airframe 108. Thus, deformable clips 142, 144, 146, 148 hold sump plate 126 in its proper position adjacent to access hole 132 and the surrounding wing structure under normal operating conditions. While deformable clips 142, 144, 146, 148 are illustrated as holding bottom side 124 of fuel cell 102 in its place during normal operating conditions, deformable clips 142, 144, 146, 148 may also be used to hold the other sides 116, 118, 120, 122 of fuel cell 102 adjacent to other parts of wing airframe 108. In addition to, or in lieu of, sump plate 126, any number of deformable clips 142, 144, 146, 148 may be used to secure other components that are part of, or coupled to, fuel cell 102, such as a fuel port.

In addition to securing fuel cell 102 under normal operating conditions, deformable clips 142, 144, 146, 148 are deformable to allow fuel cell 102 to move independently of wing airframe 108, including wing skin 110, in response to an impact, including a crash, of aircraft 106. The deformation of deformable clips 142, 144, 146, 148 allows bottom side 124 of fuel cell 102 to move away from access hole 132 as indicated by arrow 158 in FIGS. 5A-5C. Deformable clips 142, 144, 146, 148 lessen the load on fuel cell 102 during an impact by allowing fuel cell 102 to move and pull away from wing airframe 108 and surrounding structure of aircraft 106, thereby protecting fuel cell 102 from damage including rips, tears, splits, ruptures or leaks that can lead to fuel escaping from fuel cell 102 and the associated fire hazard. When deformable clips 142, 144, 146, 148 deform, fuel cell 102 can more freely move within wing 104, preventing strain and stress loads on fuel cell 102. The size, shape and material composition of deformable clips 142, 144, 146, 148 may be selected such that the deformable clips 142, 144, 146, 148 are capable of withstanding any predetermined threshold load before deforming.

Figure 5A:
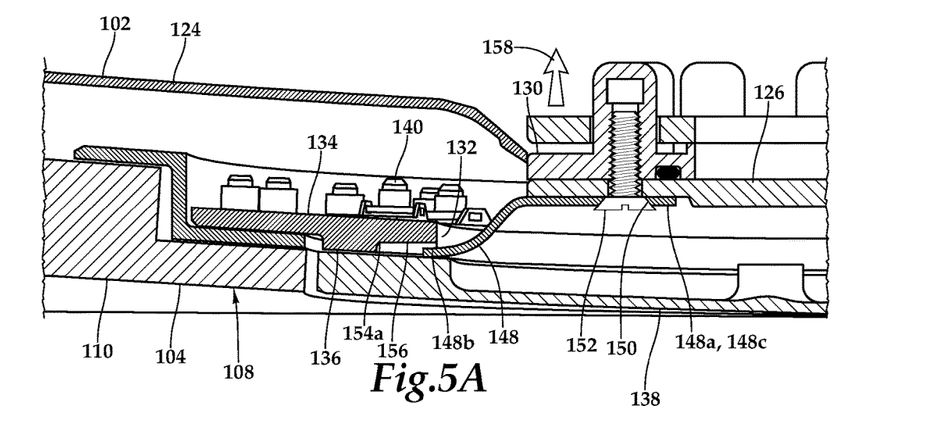
FIGS. 5A-5C are cross-sectional views of a deformable clip experiencing deformation in accordance with embodiments of the present disclosure.
Figure 5B:
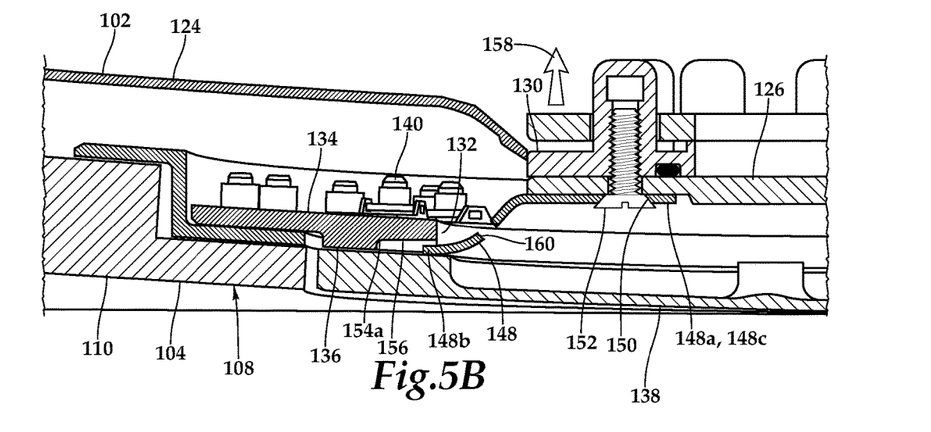
Figure 5C:
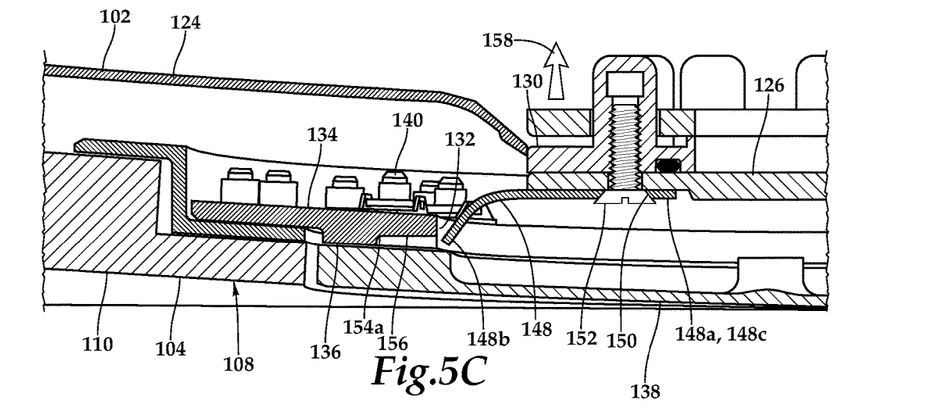

Deformable clips 142, 144, 146, 148 may deform and absorb energy in a variety of ways, such as by shearing, yielding, bending, slipping out of a receiving cavity or any other type deformation that permits fuel cell 102, or portions thereof, to move relative to access hole 132 or wing airframe 108. For example, as best seen when comparing FIG. 3C to FIG. 5A, deformable clip 148, which is representative of deformable clips 142, 144, 146, bends in response to the forces resulting from an impact of aircraft 106 such that free end 148b of deformable clip 148 has a reduced overlap with access cover receiving ring 134 and sump plate 126 is able to move independently of wing airframe 108, as indicated by arrow 158. In FIG. 5B, deformable clip 148 is frangible and the forces resulting from an impact of aircraft 106 have caused a fracture 160 of deformable clip 148 that allows sump plate 126 to move independently of wing airframe 108, as indicated by arrow 158. In FIG. 5C, free end 148b of deformable clip 148 has slipped out of receiving cavity 156 entirely so as to form a non-overlapping relationship with rim 136 of access cover receiving ring 134, which allows sump plate 126 to move independently of wing airframe 108 in response to an impact of aircraft 106, as indicated by arrow 158. While deformable clip 148 has been described as bendable, frangible and movable out of receiving cavity 156 in separate figures, deformable clip 148 may have any combination of these properties depending on the application. Indeed, the failure modes of deformable clip 148 in response to an impact of aircraft 106 are numerous, allowing fuel cell 102 to be freed from wing airframe 108 in various ways.

Unlike previous securing mechanisms for fuel cells, deformable clips 142, 144, 146, 148 allow access cover 138 to be structurally tied to wing 104 to effectively carry a load, such as a wing load. Previous securing mechanisms for fuel cells precluded the integration or mountability of adjacent load-carrying outer structure on load-bearing portions, such as wing skin 110, of an aircraft. Because access holes on the skin of an aircraft are often necessary to access a fuel cell, the inability of previous securing mechanisms to integrate load-carrying outer structure causes previous techniques to be less versatile, especially when used adjacent to structurally compromising features, such as an access hole. When attempts have been made to use securing mechanisms adjacent to structurally compromising features, such attempts have been more complicated and less reliable than the illustrative embodiments.

Figure 6:
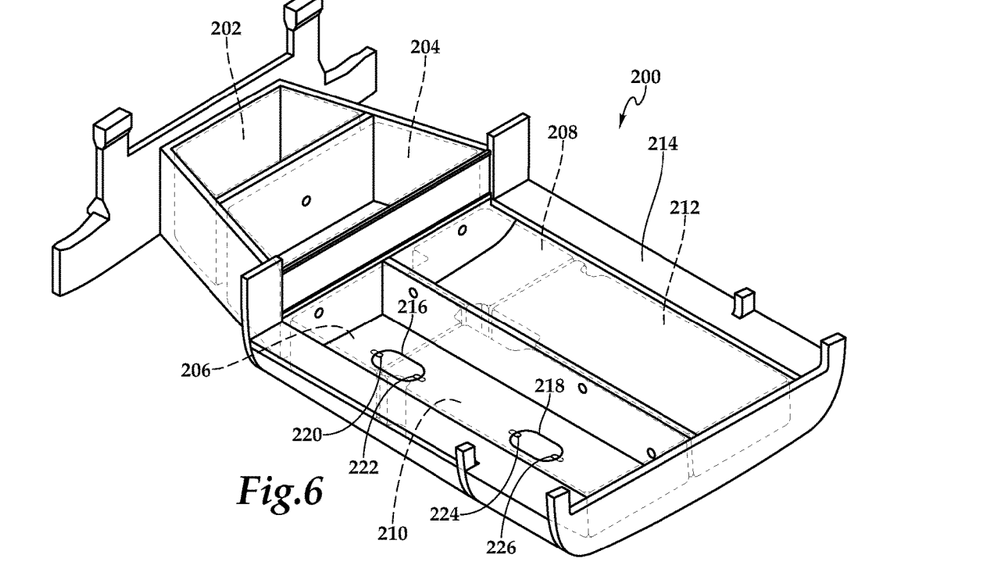
FIG. 6 is an isometric view of fuel cells secured to a fuel cell receiving assembly using deformable clips in accordance with embodiments of the present disclosure.

Referring to FIG. 6 in the drawings, a fuel system for an aircraft is schematically illustrated and generally designated 200. Fuel system 200 includes forward fuel cell 202, middle fuel cell 204, feed cells 206, 208 and aft fuel cells 210, 212. Fuel cells 202, 204, 206, 208, 210, 212 are interconnected and disposed within a fuel cell receiving assembly 214. Fuel cell receiving assembly 214 may be disposed in, or itself form a part of, the fuselage of an aircraft. Access holes 216, 218 allow access to feed cell 206 and aft fuel cell 210. Although not shown, access holes may also be located adjacent to forward fuel cell 202, middle fuel cell 204, feed cell 208 and aft fuel cell 212. Deformable clips 220, 222 and 224, 226 secure the bottom sides of feed cell 206 and aft fuel cell 210 to fuel cell receiving assembly 214 during normal operating conditions, respectively. In response to an impact of the aircraft, deformable clips 220, 222, 224, 226 may deform in any of the aforementioned failure modes to allow feed cell 206 and aft fuel cell 210 to move independently of fuel cell receiving assembly 214. Forward fuel cell 202, middle fuel cell 204, feed cell 208 and aft fuel cell 212 may also include deformable clips (not shown) that allow for such independent movement in response to an impact. Thus, deformable clips 220, 222, 224, 226 of the illustrative embodiments may be used to secure fuel cells located in any portion of an aircraft, including the fuselage, wings or other areas, and may or may not integrate a sump plate.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A fuel system for an aircraft having an airframe, the fuel system comprising:
   a fuel cell having a plurality of sides including a first side; and
   at least one deformable clip having a secured end and a free end, the secured end coupled to the first side of the fuel cell, the free end overlapping the airframe such that the first side of the fuel cell is positioned adjacent to the airframe;
   wherein, the at least one deformable clip is deformable to allow the fuel cell to move independently of the airframe in response to an impact of the aircraft, thereby protecting the fuel cell from damage resulting from the impact.

2. The fuel system as recited in claim 1 wherein the at least one deformable clip further comprises at least one frangible clip; and
   wherein, the at least one frangible clip is subject to fracture to allow the fuel cell to move independently of the airframe in response to the impact of the aircraft.

3. The fuel system as recited in claim 1 wherein the at least one deformable clip further comprises at least one bendable clip; and
   wherein, the at least one bendable clip is bendable to allow the fuel cell to move independently of the airframe in response to the impact of the aircraft.

4. The fuel system as recited in claim 3 wherein the at least one bendable clip is subject to move into a non-overlapping relationship with the airframe to allow the fuel cell to move independently of the airframe in response to the impact of the aircraft.

5. The fuel system as recited in claim 1 wherein the airframe has a rim with an access hole defined therein, the free end of the at least one deformable clip adapted to overlap the rim.

6. The fuel system as recited in claim 5 wherein the at least one deformable clip deforms to allow the first side of the fuel cell to move away from the access hole in response to the impact of the aircraft.

7. The fuel system as recited in claim 5 further comprising an access cover coupled to the airframe and adapted to cover the access hole.

8. The fuel system as recited in claim 5 wherein the at least one deformable clip further comprises a plurality of deformable clips circumferentially disposed around the access hole, the free end of each of the plurality of deformable clips overlapping the rim.

9. The fuel system as recited in claim 8 wherein the first side of the fuel cell further comprises a bottom side of the fuel cell.

10. The fuel system as recited in claim 9 wherein the bottom side of the fuel cell further comprises a sump plate adjacent to the access hole, the sump plate adapted to accumulate fuel, the secured end of each of the plurality of deformable clips coupled to the sump plate.

11. The fuel system as recited in claim 7 wherein the airframe further comprises an access cover receiving ring forming the rim, the access cover coupled to the access cover receiving ring; and
wherein, the free end of the at least one deformable clip overlaps the access cover receiving ring.

12. The fuel system as recited in claim 7 wherein the access hole is formed at a load-bearing portion of the airframe adapted to withstand a threshold load; and
wherein, the access cover further comprises a load-bearing access cover adapted to withstand the threshold load.

13. The fuel system as recited in claim 12 wherein the load-bearing portion of the airframe further comprises a wing skin contoured into a wing shape and the threshold load further comprises a threshold wing load; and
wherein, the access cover is shaped to match the contour of the wing skin and is adapted to withstand the threshold wing load.

14. The fuel system as recited in claim 7 wherein the rim and the access cover form a receiving cavity adapted to receive the free end of the at least one deformable clip.

15. The fuel system as recited in claim 14 wherein the rim further comprises a receiving groove at least partially forming the receiving cavity.

16. An aircraft comprising:
an airframe; and
a fuel system comprising:
a fuel cell having a plurality of sides including a first side; and
at least one deformable clip having a secured end and a free end, the secured end coupled to the first side of the fuel cell, the free end overlapping the airframe such that the first side of the fuel cell is positioned adjacent to the airframe;
wherein, the at least one deformable clip is deformable to allow the fuel cell to move independently of the airframe in response to an impact of the aircraft, thereby protecting the fuel cell from damage resulting from the impact.

17. The aircraft as recited in claim 16 wherein the aircraft further comprises a tiltrotor aircraft.

18. The aircraft as recited in claim 16 wherein the fuel cell further comprises a fuel bag.

19. The aircraft as recited in claim 16 wherein the airframe further comprises a wing airframe including a rim with an access hole defined therein;
wherein, the fuel system further comprises an access cover coupled to the wing airframe and adapted to cover the access hole; and
wherein, the rim and the access cover form a receiving cavity adapted to receive the free end of the at least one deformable clip.

20. The aircraft as recited in claim 19 wherein the wing airframe further comprises a wing skin that is subject to a wing load during flight; and
wherein, the access cover is adapted to withstand the wing load.

* * * * *